US011465928B2

(12) United States Patent
Vild et al.

(10) Patent No.: US 11,465,928 B2
(45) Date of Patent: Oct. 11, 2022

(54) GLASS SHEET ACQUISITION AND POSITIONING SYSTEM AND ASSOCIATED METHOD FOR AN INLINE SYSTEM FOR MEASURING THE OPTICAL CHARACTERISTICS OF A GLASS SHEET

(71) Applicant: GLASSTECH, INC., Perrysburg, OH (US)

(72) Inventors: Michael Vild, Toledo, OH (US); Jason Addington, Sylvania, OH (US); Benjamin Moran, Perrysburg, OH (US)

(73) Assignee: GLASSTECH, INC., Perrysburg, OH (US)

( * ) Notice: Subject to any disclaimer, the term of this patent is extended or adjusted under 35 U.S.C. 154(b) by 0 days.

(21) Appl. No.: 17/088,055

(22) Filed: Nov. 3, 2020

(65) Prior Publication Data

US 2021/0094866 A1    Apr. 1, 2021

Related U.S. Application Data

(62) Division of application No. 14/639,655, filed on Mar. 5, 2015, now Pat. No. 10,851,013.

(51) Int. Cl.
*G01N 21/896* (2006.01)
*G01N 21/958* (2006.01)
(Continued)

(52) U.S. Cl.
CPC ............ *C03B 35/14* (2013.01); *B65G 47/902* (2013.01); *B65G 49/068* (2013.01);
(Continued)

(58) Field of Classification Search
USPC ....................................................... 348/92
See application file for complete search history.

(56) References Cited

U.S. PATENT DOCUMENTS 3,049,879 A    8/1962   Clark
4,325,723 A    4/1982   Kellar et al.
(Continued)

FOREIGN PATENT DOCUMENTS

CN    2776925 Y    5/2006
CN    101762376 A    6/2010
(Continued)

OTHER PUBLICATIONS

Mexican Office Action dated Aug. 9, 2021 (with English Machine Translation), Application No. MX/a/2017/011315, Applicant Glasstech, Inc., 6 Pages.
(Continued)

*Primary Examiner* — Mikhail Itskovich
(74) *Attorney, Agent, or Firm* — Brooks Kushman P.C.

(57) ABSTRACT

A method is provided for measuring optical characteristics of a glass sheet as the glass sheet is conveyed in a system for fabricating glass sheets including one or more processing stations and one or more conveyors for conveying the glass sheet during processing. The method comprises providing a background screen including contrasting elements arranged in a pre-defined pattern and a camera for acquiring an image of the background screen; acquiring data associated with a shape of a glass sheet travelling on a conveyor upstream from the background screen; removing the glass sheet from the conveyor; and positioning the glass sheet between the camera and the screen and thereafter acquiring an image of the background screen; re-positioning the glass sheet for continued movement of the glass sheet on the conveyor; and performing one or more processing operations using the acquired image data to analyze the optical characteristics of the glass sheet.

19 Claims, 6 Drawing Sheets

(51) Int. Cl.
*C03B 35/14* (2006.01)
*B65G 49/06* (2006.01)
*G01M 11/02* (2006.01)
*B65G 47/90* (2006.01)
*G01N 21/89* (2006.01)
*G01N 21/84* (2006.01)

(52) U.S. Cl.
CPC .... *G01M 11/0207* (2013.01); *G01M 11/0214* (2013.01); *G01M 11/0264* (2013.01); *G01N 21/896* (2013.01); *G01N 21/8914* (2013.01); *G01N 21/958* (2013.01); *B65G 49/064* (2013.01); *C03B 2225/02* (2013.01); *G01N 2021/845* (2013.01); *G01N 2021/9586* (2013.01); *G01N 2201/12* (2013.01)

(56) References Cited

U.S. PATENT DOCUMENTS

| | | | |
|---|---|---|---|
| 4,895,244 | A | 1/1990 | Flaugher et al. |
| 5,238,100 | A | 8/1993 | Rose, Jr. et al. |
| 5,691,811 | A | 11/1997 | Kihira |
| 5,870,204 | A | 2/1999 | Chiu et al. |
| 5,887,077 | A | 3/1999 | Bongardt et al. |
| 5,927,469 | A | 7/1999 | Dunifon et al. |
| 6,038,887 | A * | 3/2000 | Vild .................. C03B 23/0252 425/436 R |
| 6,208,412 | B1 | 3/2001 | Ladewski |
| 6,359,686 | B1 | 3/2002 | Ariglio et al. |
| 6,724,477 | B2 | 4/2004 | Kitamura et al. |
| 7,403,872 | B1 * | 7/2008 | St. Onge .................. B07C 5/08 |
| 8,049,879 | B2 * | 11/2011 | Shetterly ............ G01N 21/958 356/239.2 |
| 8,256,244 | B2 | 9/2012 | Imaichi et al. |
| 8,472,013 | B2 | 6/2013 | Kato |
| 9,933,373 | B2 | 4/2018 | Vild et al. |
| 10,851,013 | B2 | 12/2020 | Vild et al. |
| 2002/0063862 | A1 | 5/2002 | Kitamura et al. |
| 2002/0123868 | A1 | 9/2002 | Yajima |
| 2004/0057046 | A1 | 3/2004 | Abbott et al. |
| 2008/0032066 | A1 | 2/2008 | Stiblert et al. |
| 2008/0256704 | A1 | 10/2008 | Conway |
| 2009/0199594 | A1 | 8/2009 | Abbott et al. |
| 2009/0282871 | A1 | 11/2009 | Shetterly et al. |
| 2010/0028567 | A1 | 2/2010 | Suizu et al. |
| 2010/0218555 | A1 | 9/2010 | Tomioka et al. |
| 2012/0098959 | A1 | 4/2012 | Addington |
| 2012/0234459 | A1 | 9/2012 | Nally et al. |
| 2013/0091896 | A1 | 4/2013 | Nitschke et al. |
| 2014/0146165 | A1 | 5/2014 | Furnas |
| 2014/0240489 | A1 | 8/2014 | Furnas |
| 2015/0308943 | A1 | 10/2015 | Vild et al. |
| 2016/0257598 | A1 | 9/2016 | Vild et al. |

FOREIGN PATENT DOCUMENTS

| | | |
|---|---|---|
| CN | 102134004 A | 7/2011 |
| JP | S61151409 A | 7/1986 |
| JP | 2000-233824 A | 8/2000 |
| JP | 2001-130742 A | 5/2001 |
| JP | 2008070237 A | 3/2008 |
| SU | 408877 A1 | 11/1973 |
| WO | 2014/201725 A1 | 12/2014 |

OTHER PUBLICATIONS

Notification of Transmittal of the International Search Report and the Written Opinion of the International Searching Authority, or the Declaration from corresponding International application No. PCT/US16/16095, dated Apr. 7, 2016 (12 pages).
U.S. Patent Application "Glass Sheet Acquistion and Positioning System and Associated Method for an Inline System for Measuring the Optical Characteristics of a Glass Sheet", U.S. Appl. No. 14/264,231, 29 Pages.
U.S. Office Action dated Dec. 2, 2016, U.S. Appl. No. 14/264,231, 21 Pages.
U.S. Final Office Action dated May 25, 2017, U.S. Appl. No. 14/264,231, 15 Pages.
U.S. Notice of Allowance dated Jan. 29, 2018, U.S. Appl. No. 14/264,231, 12 Pages.
PCT International Search Report and Written Opinion of the International Searching Authority dated May 20, 2015, Application No. PCT/US2015/018229, Applicant Glasstech, Inc., 8 Pages.
U.S. Corrected Notice of Allowance dated Feb. 16, 2018, U.S. Appl. No. 14/264,231, 7 Pages.
Francesco Adamo et al., "Calibration of an Inspection System for Online Quality Control of Satin Glass", IEEE Transaction on Instrumentation and Measurement, vol. 59, No. 5, May 2010, pp. 1035-1046.
Extended European Search Report dated Nov. 6, 2018, Application No. 16759241.9-1205/3265411, Applicant Glasstech, Inc., 8 pages.
Chinese Office Action dated Nov. 26, 2018, Application No. 201680020349.9, 12 Pages.
Russian Office Action dated Jul. 11, 2019, Application No. 2017131850/11(055880), Applicant Glasstech, Inc., 7 Pages.
Russian Search Report dated Jul. 11, 2019, Application No. 2017131850/11(055880), Applicant Glasstech, Inc., 2 Pages.
Chinese Second Office Action dated Sep. 11, 2019, Application No. 201680020349.9, 19 Pages.
Japanese Notice of Reasons for Refusal dated Oct. 11, 2019, Application No. 2017-546116, 7 Pages.
Brazilian Preliminary Examination Report dated May 19, 2020 (with English Machine Translation), Application No. BR112017018845-7 Applicant Glasstech, Inc., (8 Pages).
Indian First Examination Report dated Jun. 22, 2020, Application No. 201717034952, 6 Pages.
Japanese Notice of Rejection dated Aug. 28, 2020 (with English Machine Translation), Application No. 2017-546116, 6 Pages.
European Communication dated Apr. 26, 2021, Application No. 16 759 241.9-1205, Applicant Glasstech, Inc., 4 Pages.
Mexican Second Office Action dated Jan. 24, 2022 (with English Machine Translation), Application No. MX/a/2017/011315, Applicant Glasstech, Inc., 10 Pages.
Canadian Office Action dated Feb. 1, 2022, Application No. 2,978,443 Applicant Glasstech, Inc., 4 Pages.
European Communication Pursuant to Article 94(3) EPC, dated Jun. 28, 2022, Application No. 16 759 241.9-1205, Applicant Glasstech, Inc., 8 Pages.

* cited by examiner

GLASS SHEET ACQUISITION AND POSITIONING SYSTEM AND ASSOCIATED METHOD FOR AN INLINE SYSTEM FOR MEASURING THE OPTICAL CHARACTERISTICS OF A GLASS SHEET

CROSS-REFERENCE TO RELATED APPLICATIONS

This application is a divisional of U.S. application Ser. No. 14/639,655 filed Mar. 5, 2015, the disclosure of which is hereby incorporated in its entirety by reference herein.

TECHNICAL FIELD

This disclosure relates to a method and apparatus for measuring transmitted optical distortion in glass sheets installed in-line in a glass sheet processing system.

BACKGROUND

Manufacturers of glass sheets, particularly glass sheets formed into various curved shapes for use as automotive windshields, backlites, and sidelites, are interested in measuring and evaluating the amount of optical distortion in the formed sheets that might be perceived by a human observer, such as the operator or passenger in a vehicle in which the glass may be mounted as the windshield, backlite, or sidelite. Manufacturers, as well, desire to identify small marks or other defects that are visible on the surface of the form glass sheets.

Various types of glass sheet optical inspection systems are known. One known optical inspection system is disclosed in United States Application Publication No. 2012/0098959 A1, which application is also assigned to the assignee of the present application. This disclosed optical inspection system may be implemented in either a laboratory (i.e., off-line) or an in-line configuration in which the inspection system is mounted to inspect glass sheets as they are being conveyed in a processing system.

Thus, it may be desirous to implement an in-line configuration which quickly identifies a glass part on a moving conveyor as it is conveyed during processing, and which includes a simple, reliable mechanism for collecting the glass sheet, positioning the glass sheet for image acquisition by the inspection system, and returning the glass sheet to a conveyor for further processing.

It may also be useful to identify a glass sheet as one of a plurality of known part shapes as the glass sheet is conveyed upstream from the optical inspection system and control the glass sheet acquisition and positioning mechanism to retain and accurately position the glass sheet for processing by the optical inspection system based upon its shape.

SUMMARY

The disclosed glass sheet acquisition and positioning system and associated method are utilized in an in-line optical inspection system for measuring the optical characteristics of a glass sheet, wherein the in-line system is installed in a system for fabricating glass sheets, which system for fabricating glass sheets includes one or more processing stations and one or more conveyors for conveying the glass sheet from station to station during processing. In addition to the disclosed glass sheet acquisition and positioning system, the optical inspection system includes a background screen having a predefined contrasting pattern, a digital camera for acquiring an image of the background screen with a glass sheet positioned between the camera and the screen at a preselected position, and a computer including logic for receiving the captured image data and performing one or more optical processing operations to analyze the optical characteristics of the glass sheet.

The glass sheet acquisition and positioning system includes an exterior support frame mounted in proximity to the conveyor between the camera and the background screen and a glass sheet support frame connected to the exterior support frame such that the glass sheet support frame may be selectively positioned from a first generally horizontal orientation in the plane of the glass sheet on the conveyor to an upwardly-tilted orientation to thereby position the glass sheet between the camera and the screen at a preselected position, and thereafter re-position and release the glass sheet from the glass sheet support frame for continued movement on the conveyor.

The glass sheet acquisition and positioning system may also include a positioning mechanism actuable for accurately orienting a glass sheet relative to the glass sheet support frame as the glass sheet is moves generally into position on the conveyor, a retaining mechanism for securing the glass sheet to the glass sheet support frame.

The glass sheet acquisition and positioning system may also include a transport mechanism actuable for lifting the glass sheet off of the conveyor and holding the glass sheet in position so that the positioning mechanism can engage and accurately orient the glass sheet relative to the glass sheet support frame.

The glass sheet acquisition and positioning system may also include a programmable control including at least one processor programmed to execute logic for controlling the transport mechanism, the positioning mechanism and the retaining mechanism The glass sheet acquisition and positioning system may also include a glass sheet part identifier including a sensor mounted at a desired location upstream from the glass sheet support frame for acquiring data associated with the shape of the glass sheet. The programmable control may also include logic for analyzing the acquired data and identifying the glass sheet as one of a set of know part shapes, and logic for controlling one or more of the moveable components of the glass sheet acquisition and positioning system based in part upon the identified part shape for each of the set of known part shapes.

An in-line glass sheet optical inspection system and method are also disclosed. The in-line glass sheet optical inspection system is mounted to inspect glass sheets as they are transported on a conveyor associated with a glass sheet processing system which performs one or more heating, bending, tempering, heat-strengthening, or other fabricating operations on the glass sheets. The disclosed optical inspection system includes a background screen including contrasting elements arranged in a pre-defined pattern, a digital camera for acquiring an image of the background screen, and the disclosed glass sheet acquisition and positioning system, for receiving a glass sheet at it is conveyed on one of the glass sheet processing system conveyors, momentarily removing the glass sheet from the conveyor and positioning the glass sheet in the path between the camera and the background screen so that the camera may capture an image of the pattern transmitted through the glass sheet, and then re-positioning the glass sheet on the conveyor.

The disclosed in-line optical inspection system also includes at least one computer including the previously described part-shape identification and sheet acquisition and positioning mechanism control logic, as well as logic for receiving the captured image data and performing one or more optical processing operations to analyze the optical characteristics of the glass sheet and display or otherwise report selected information associated with the analysis.

DETAILED DESCRIPTION

As required, detailed embodiments are disclosed herein; however, it is to be understood that the disclosed embodiments are merely exemplary, and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
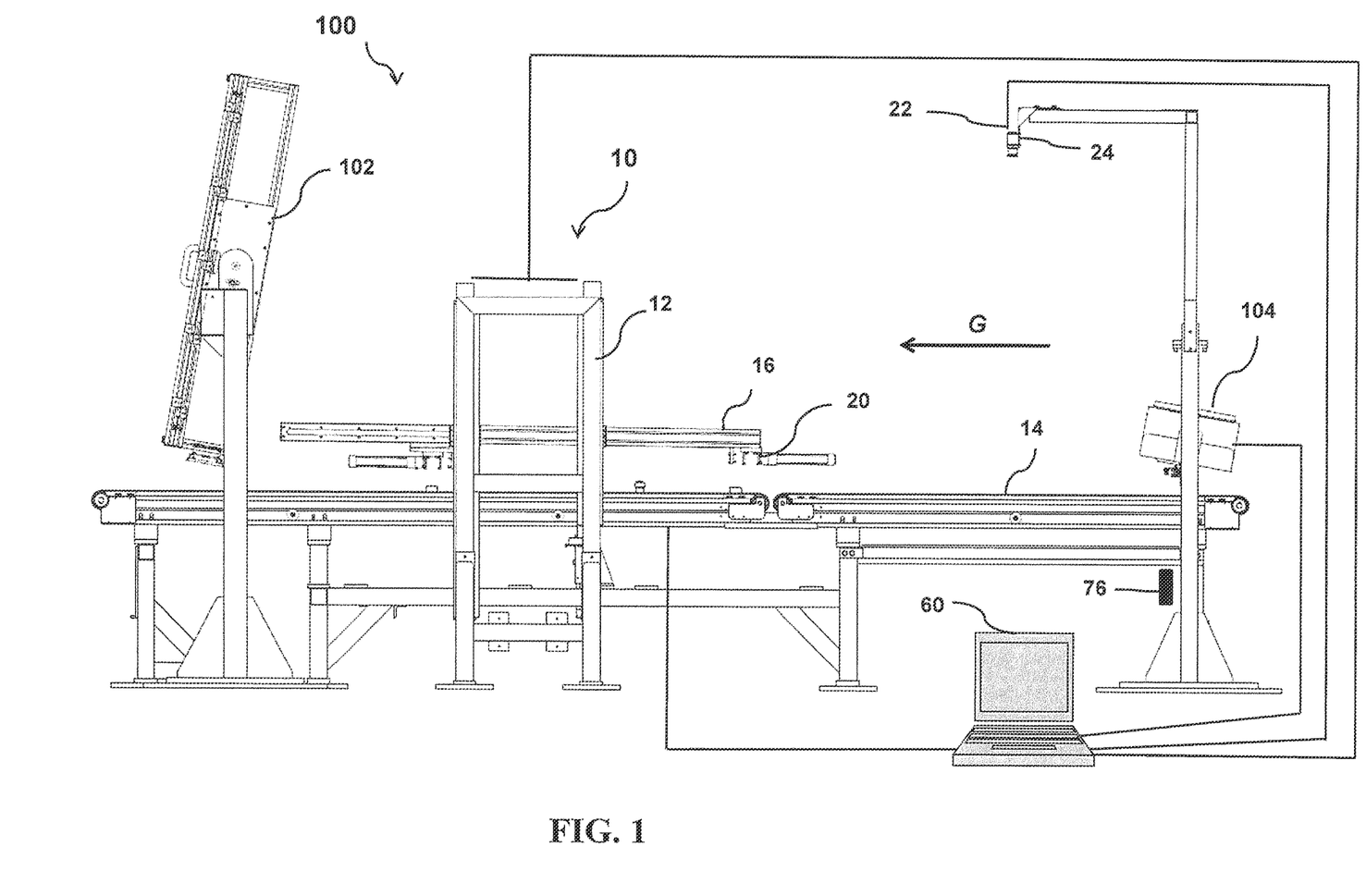
FIG. 1 is a side view of one embodiment of the disclosed glass sheet optical inspection system.

Referring to FIG. 1, a glass sheet acquisition and positioning system, generally indicated as 10, is disclosed for incorporation into, for example, an inline glass sheet optical characteristics inspection system generally indicated as 100. The inline optical inspection system 100, as well as the incorporated glass sheet acquisition and positioning system 10, may, in turn, be incorporated into a system for fabricating glass sheets including one or more processing stations and one or more conveyors 14 for conveying the glass sheets from station to station during processing, such as fabrication systems 200 and 300 schematically shown in FIGS. 6 and 7.

The glass sheet acquisition and positioning system 10 is integrated into the inline optical inspection system 100 to facilitate acquisition and positioning of a glass sheet for analysis by the inline optical system 100. The inline optical system 100 may include a background screen 102 including contrasting elements arranged in a predefined pattern, a digital camera 104 for acquiring an image of the background screen 102 with a glass sheet positioned between the camera and the screen at a preselected position, and one or more computers and/or programmable controls (indicated generally as 60) including logic for controlling the digital camera 104 and processing the acquired data to analyze the optical characteristics of the glass sheet.

Referring still to FIG. 1, the glass sheet acquisition and positioning system 10 includes an exterior frame 12 mounted in proximity to the conveyor 14 between the background screen 102 and the camera 104. The glass sheet acquisition and positioning system 10 further includes a moveable glass sheet support frame 16 operably connected to the exterior support frame 12 such the glass sheet support frame 16 may be moved from a first, generally horizontal orientation to a second, upwardly-tilted orientation whereby the glass sheet support frame 16 (and a glass sheet retained within the frame 16) is elevated from the plane of the conveyor 14 to position the glass sheet between the camera 104 and the screen 102 at a preselected position, so that the inline optical inspection system may collect the desired data for that particular glass sheet. The moveable glass sheet support frame 16 may thereafter be returned to its generally horizontal position (as shown in FIG. 1) and release the glass sheet from the frame 16 back onto the conveyor 14 for conveyance of the glass sheet for further processing by the glass sheet processing system.

The glass sheet acquisition and positioning system 10 further includes a positioning mechanism 18 (shown in FIGS. 2 and 3) which is controllable to contact a glass sheet as it is conveyed on the conveyor 14 (or, alternatively, after it has been removed from the conveyor as hereinafter described), and accurately orient the glass sheet, and a retaining mechanism 20 for securing the glass sheet on the glass sheet support frame 16 after it has been properly positioned by the positioning mechanism 18. The glass sheet acquisition and positioning system 10 further includes a programmable control 60 including at one or more processors programmed to execute logic for controlling the positioning mechanism 18 and the retaining mechanism 20 to perform the functions described herein.

Figure 2:
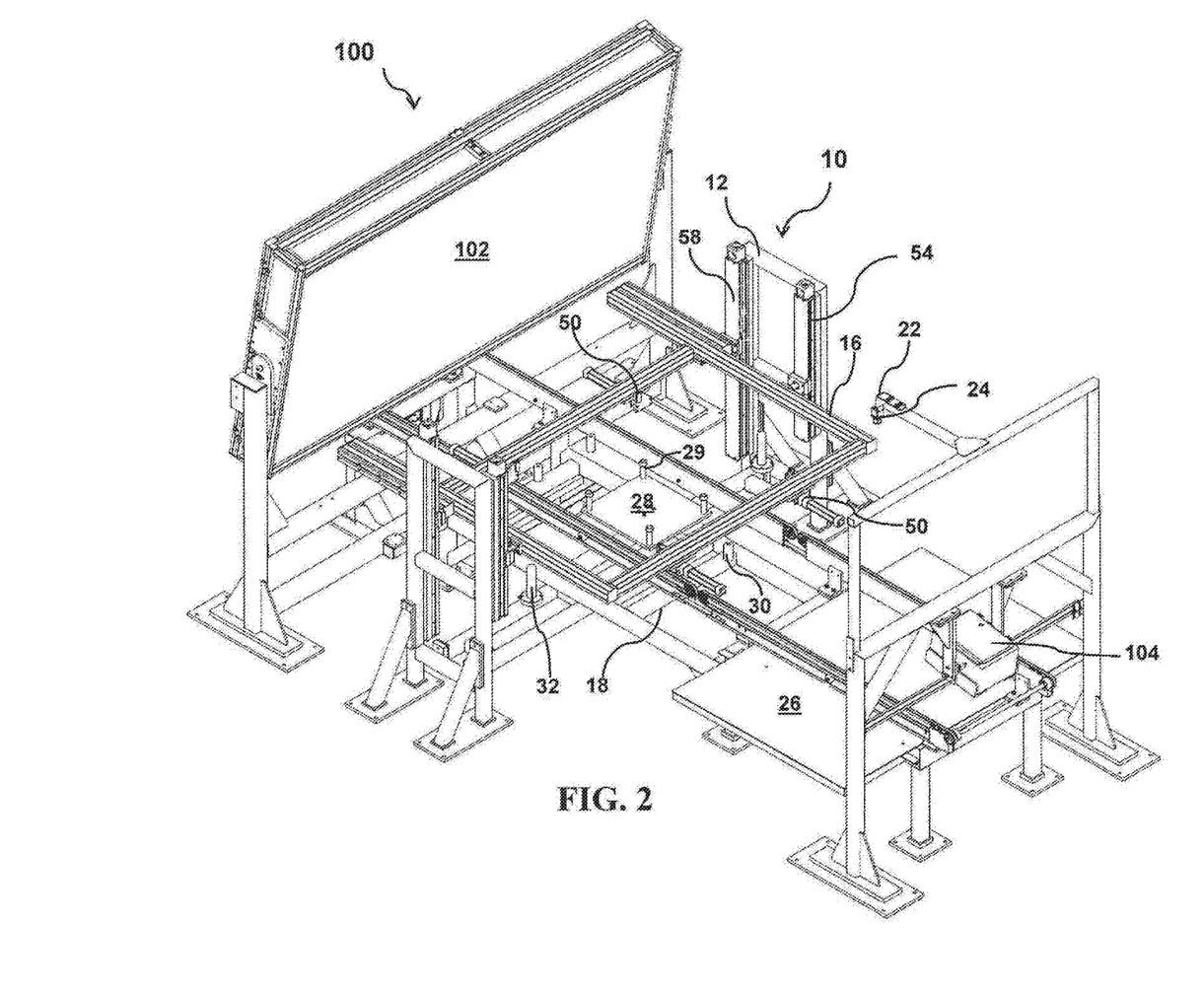
FIG. 2 is a perspective view of the disclosed glass sheet optical inspection system of FIG. 1.

Referring now to FIG. 2, the glass sheet acquisition and positioning system 10 may also include a glass sheet part identifier 22 including a shape sensor 24 mounted in proximity to the conveyor 14, upstream from the glass sheet support frame 16. The sensor 24 is controlled for activation to acquire data associated with the shape of a glass sheet traveling on the conveyor 14. The sensor 24 is operably connected to one or more processors, such as computer 60 (as shown in FIG. 1), wherein the computer includes logic for analyzing the data acquired by the sensor 24 and identifying the glass sheet as one of a set of known part shapes stored in memory in the computer 60. In the illustrated embodiment of the system 10, the part identifier 22 also includes a background screen 24 mounted below the conveyor 14 to provide a suitably contrasting background so that sensor 24 can acquire data suitable to allow the system logic to efficiently discern the shape of the glass part as it is conveyed between the sensor 24 and the background panel 26. In the illustrated embodiment, sensor 24 is a digital image recognition camera, specifically, a 1.3 Mpixel CCD camera, although it will be appreciated in those skilled in the art that any of a variety of image sensors may be utilized to capture an image of the glass sheet for shape analysis.

Referring still to FIG. 2, the glass sheet acquisition and positioning system 10 may also include a transport mechanism 28 which may be controllably moveable from a first position below the plane of conveyance of the conveyor 14 (as shown in FIG. 2) vertically upward and into engagement with the lower surface of a glass sheet supported on the conveyor 14 as the glass sheet moves generally into position at the location of the positioning mechanism 18, such that the transport mechanism 28 engages the glass sheet and lifts it off the conveyor 14 so that it may be engaged and positioned by the positioning mechanism 18 as previously described. Conventional actuators, such as air cylinders, controlled in a known manner by a suitably programmed controller, such as computer 60 (shown in FIG. 1), or other commercially available programmable control, may be utilized to controllably position the transport mechanism as described herein.

As shown in FIG. 2, the transport mechanism 28 may include a plurality of post-like supports 29. These supports may include a Teflon®-coated spherical top surface, and/or a spherical roller ball mounted at the top of the post, which spherical surface contacts the underside of the glass sheet and supports it offline from the conveyor for positioning and acquisition by the positioning and retaining mechanisms 18 and 20.

Figure 3:
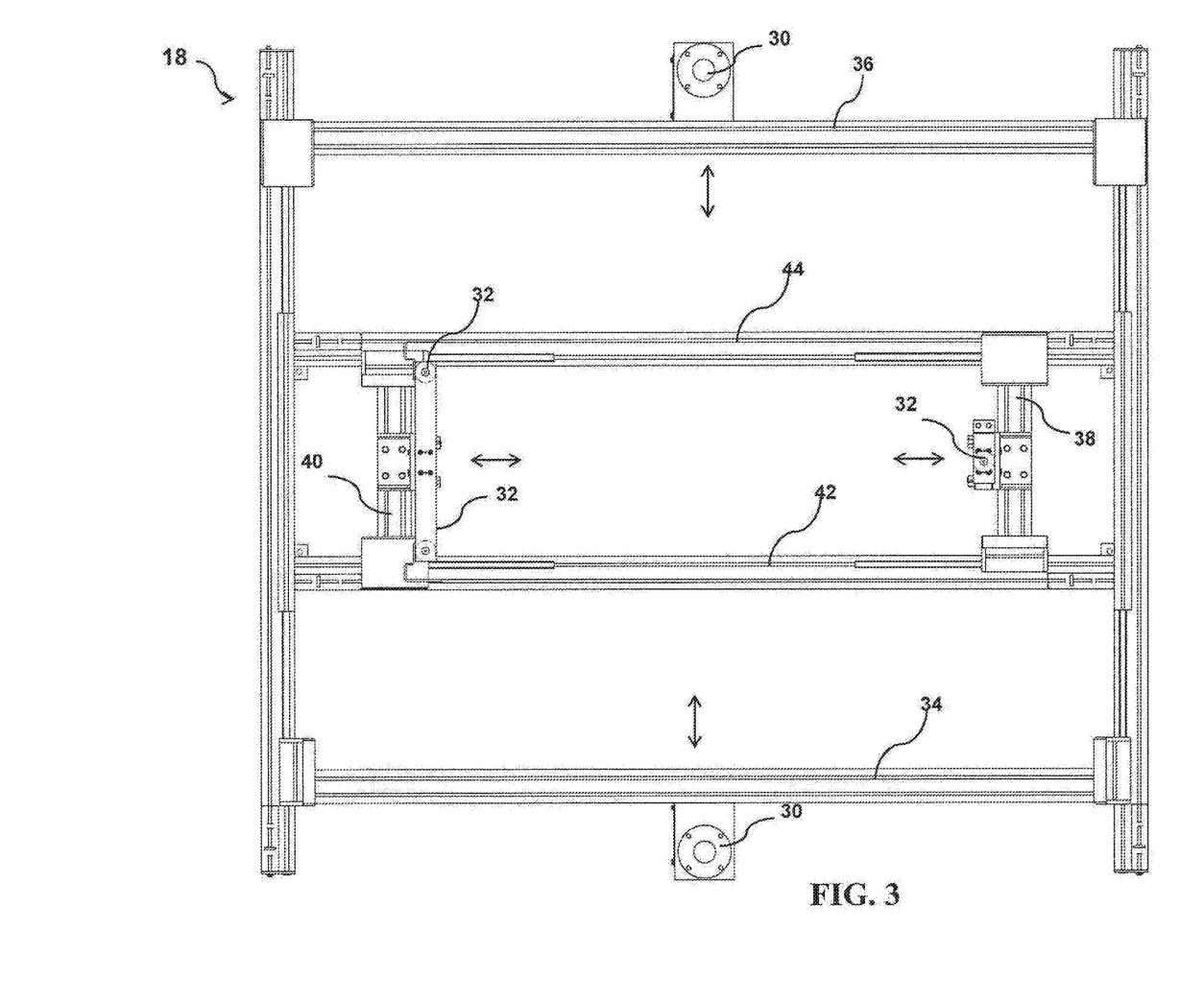
FIG. 3 is a top view of a positioning mechanism which may be utilized in the glass sheet acquisition and positioning system.

Referring now to FIGS. 2 and 3, in the disclosed embodiment the positioning mechanism 18 includes a plurality of post-like positioners 30, 32 that may be moved from positions outside the perimeter of the glass sheet toward and into contact with the glass sheet edge such that the positioners 30, 32 properly orient the glass sheet so that it may be secured in the proper position by the retaining mechanism 20. In the disclosed embodiment, two positioners 30 are mounted upstream and downstream on two parallel rails 34 and 36 of the positioning mechanism 18. Rails 34 and 36 may be powered by any one or more of a variety of conventional actuators such that they may be moveable simultaneously toward or away from each other (and the edge of the glass sheet nearest each positioner). In the illustrated embodiment, the rails 34, 36 are powered by servo motors. Similarly, positioners 32 are mounted on either side of the conveyor on rails 38 and 40. Rails 38 and 40 are slideably mounted on rails 42 and 44, and may be powered by a single actuator such that positioners 32 on opposite sides of the conveyor move simultaneously either toward or away from each other (and toward or away from the edge of the glass sheet nearest each positioner). Thus, when a glass sheet moves along the conveyor into a position generally in the area of the support frame 16, each of the positioners 30, 32 may be controlled to quickly move into contact with the glass sheet and orient the glass sheet.

Referring still to FIGS. 2 and 3, one or more of positioners 30, 32 may also be powered by a conventional actuator, such as an air cylinder, for controlled movement in the vertical direction, so that the positioners may be retracted (i.e., lowered) to a position below the plane of the conveyor, to allow the glass to pass over the positioner on the conveyor to be conveyed downstream for further processing. It will be appreciated that the servo motors, air cylinders, and/or other actuators utilized to control positioners 30 and 32 may be controlled in a manner well known in the art by a suitably programmed controller, such as computer 60 (shown in FIG. 1), or other commercially available programmable control.

In another contemplated embodiment, the positioning mechanism 18 may additionally or alternatively include other conventional sensors and actuators to sense the presence and location of a glass sheet on the conveyor and move into contact with the sheet as desired. One type of such an alternative positioning system which may be adaptable to assist in positioning the glass sheet to be secured on the retaining mechanism 20 is disclosed in U.S. Patent Application Publication No. 2013/0091896 A1 (see, in particular, positioning apparatus 54 and positioners 55, FIGS. 4 and 6-10, p. 4, ¶¶39, 41), the relevant portions of which Publication are hereby incorporated herein in their entirety.

Figure 4:
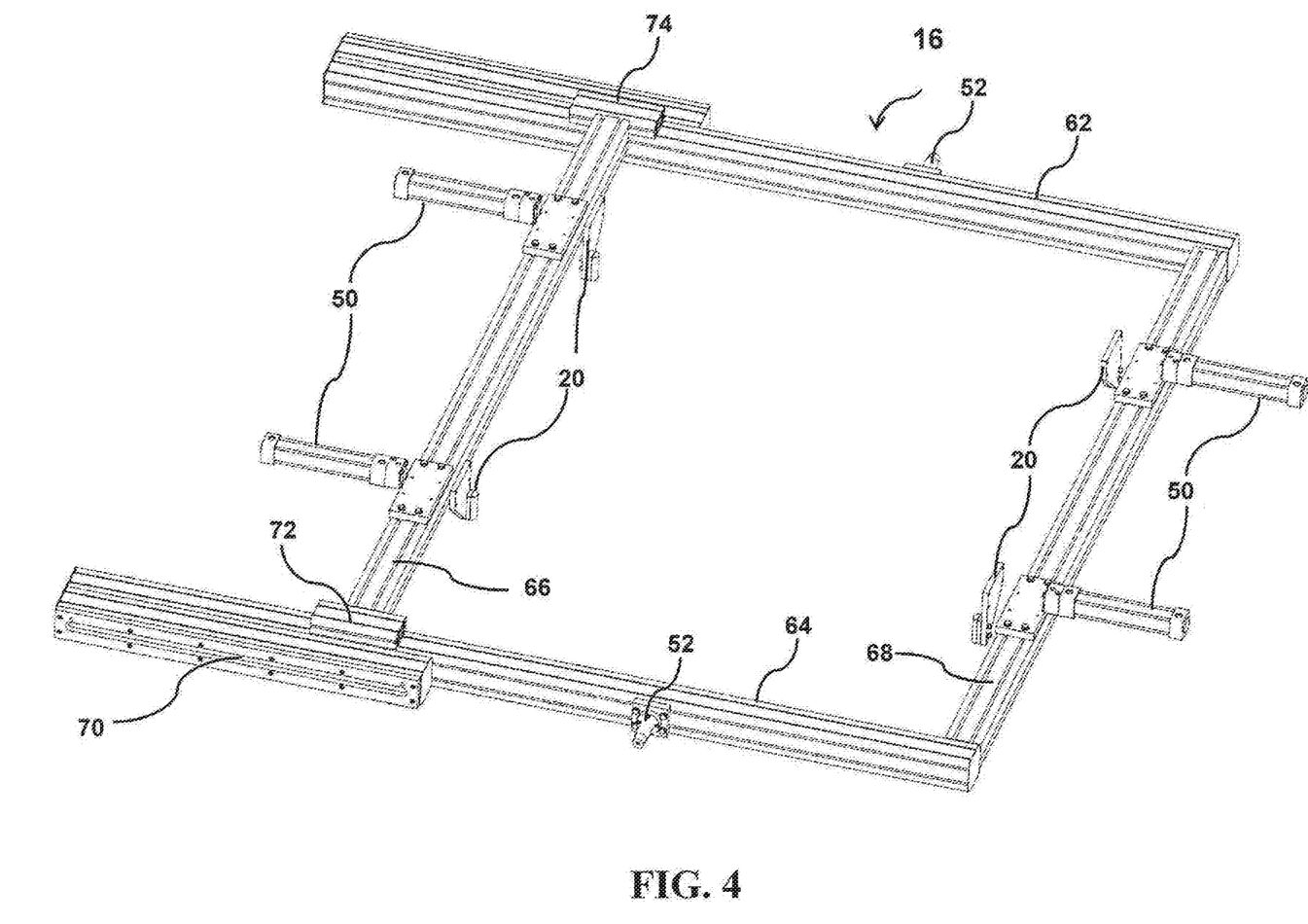
FIG. 4 is a perspective view of a glass sheet support frame which may be utilized in the glass sheet acquisition and positioning system.

Referring now to FIGS. 2 and 4, support frame 16 may include rails 62, 64, 66, and 68 which define a generally rectangular space in which the glass sheet may be positioned and retained. Rails 62 and 64 are mounted at their upstream end, such as by guide pins 52, for slidable and pivotal movement within a guideway in vertical rail 54. Each of rails 62 and 64 are also mounted at their downstream end for pivotal and slidable movement along a guideway in vertical rail 58. In the illustrated embodiment a slotted guideway 70 is provided on each of rails 62 and 64 so that an interconnecting element, such as a guide pin, may slide within guideway 70 as support frame 16 is also slidably positioned along the guideway in vertical rail 58.

Referring still to FIGS. 2 and 4, in the disclosed embodiment the retaining mechanism 20 includes a plurality of air cylinder powered clamps 50 mounted on the support frame and controllably positionable from a retracted position (shown in FIG. 4) into engagement with the perimeter edge of a glass sheet to engage and retain the glass sheet in position on the support frame 16. In the illustrated embodiment, each of the clamps 50 is powered by a conventional air cylinder which, as well, is controlled in a known manner by a suitably programmed controller, such as computer 60 (shown in FIG. 1), or other commercially available programmable control. In the disclosed embodiment, the range of travel of the clamps 50 is suitable to allow for a variety of glass sheet part sizes to be retained within a single sized support frame 16. In addition, rail 66 may be releasably secured to each of rails 62 and 64, at locations 72 and 74, so that support frame 16 can be manually adjusted to accommodate additional glass sheet part sizes, minimizing or eliminating the need to remove and install additional support frames for different glass sheet parts.

Alternatively, or additionally, other conventional gripping devices, such as suction cups or other mechanical grippers, may be mounted on support frame 16 to secure the glass sheet to the support frame 16 once the sheet has been retained in proper position by positioning mechanism 18 for acquisition by the support frame 20.

Figure 5:
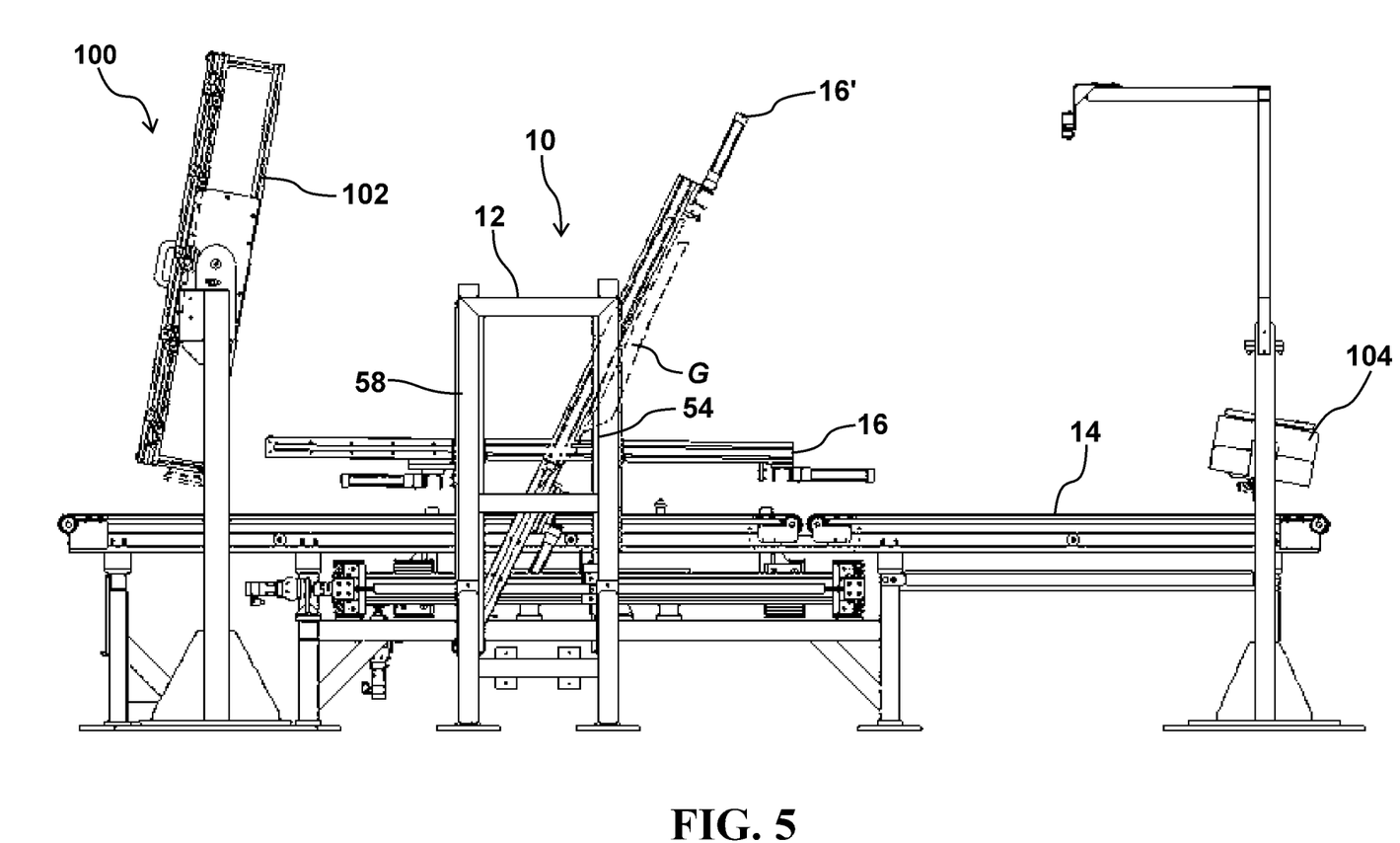
FIG. 5 is a side elevated view of one embodiment of the disclosed glass sheet optical inspection system showing the glass sheet support frame of the acquisition and positioning mechanism in two positions.

Referring now to FIGS. 1 and 5, the sequence of operation of each of the components of the glass sheet acquisition and positioning system 10 will be described in the context of the integration of the system 10 in an inline optical inspection system 100. As a glass sheet moves along conveyor 14 upstream from the acquisition and positioning system 10 (i.e., at the right edge of FIG. 1) the leading edge of the glass sheet is detected by conventional sensor 76, such as a non-contact optical switch, mounted upstream at a suitable position and operably connected (either directly or indirectly to image sensor 24) to allow the control system 60 for the glass sheet part identifier 22 to activate image sensor 24 as the glass sheet moves below image sensor 24 on the conveyor 14. The image data acquired by image sensor 24 is then analyzed and compared by the part identifier system logic to determine correspondence with one or more stored, known part shapes, and the logic thereby identifies the glass sheet as one of the known parts. The part identification for this glass sheet may thereafter be utilized by the controls for each of the positioning mechanism 18 and retaining mechanism 20 such that these components position, retain, and ultimately orient the glass sheet as desired for the optical inspection system 100 to analyze that particular part type as described hereinafter.

As the glass sheet moves downstream (i.e., from right to left in FIGS. 1 and 3) until the glass sheet is generally in position for acquisition, the transport mechanism 28 (shown in FIG. 2) is activated and moves upward, resulting in each of the supports 29 contacting the moving glass sheet and lifting the glass sheet off of the conveyor 18. Positioning mechanism 18 is then activated to move the positioners 30, 32 into contact with the glass sheet as it is supported on the transport mechanism 28 to accurately orient the glass sheet for acquisition and retention on the support frame 16. Once positioned, each of the clamps 50 on the retaining mechanism 20 may be activated to securely retain the glass sheet on the support frame 16. The support frame 16, with a glass sheet now secured thereon, is then controllably moved to orient the glass sheet in the position to allow camera 104 to record an image of the pattern on background screen 102 with the glass sheet positioned therebetween and, thereafter, analyze the image date to assess and report on the optical characteristics of the glass sheet.

Referring still to FIG. 5, the sequence of motions of the support frame in the disclosed embodiment will now be described. The support frame 16 is initially oriented in a generally horizontal position, generally parallel to the conveyor 14 (shown at 16 in FIG. 3). The frame 16 is slidably positioned at its pivotal connection 52 along the upstream vertical rail 54 to a fixed position 56 (located at the top of rail 54 in the disclosed system). The support frame 16 is simultaneously or thereafter moved along the downstream vertical rail 58 such that the support frame 16 is tilted to the desired inspection angle for this identified part. The support frame 16 and glass sheet are now oriented in the position indicated by 16' in FIG. 5. Once the glass sheet is moved to position 16', the control 60 for the inline optical inspection system activates camera 104 to record the image of the pattern of the background screen 102 transmitted through the glass sheet. This image information is then analyzed in a known manner to provide optical distortion information and other quality control data for this glass sheet.

Immediately upon activation of the camera 104, support frame 16 may be moved in a pattern generally in reverse of that previously described, to thereby reposition support frame 16 and the glass sheet retained thereon in the horizontal location immediately above conveyor 14. The retaining mechanism 20 may then be activated to release the glass sheet onto transport mechanism 28, or, alternatively, directly onto conveyor 14 for further processing.

It will be appreciated that, in the disclosed embodiment, identification of the part type allows positioning mechanism 18 and retaining mechanism 20 to position and retain, respectively, the glass sheet on the support frame in a position such that, when the support frame is moved upward on vertical rail 54 to position 56, each of the identified parts is positioned such that the centerline of the glass sheet is coincident with the principal axis of camera 104. It will also be appreciated that the system may be programmed to move the support frame (by sliding the frame along downstream vertical rail 58 and pivoting it about point 56) to any desired angle based upon part type, and/or user preference.

Referring again to FIGS. 1, 2, and 5, an in-line glass sheet optical inspection system 100 is also disclosed. The in-line glass sheet optical inspection system 100 is mounted to inspect glass sheets as they are transported on a conveyor 14 associated with a glass sheet processing system which performs multiple fabricating operations on the glass sheets. The disclosed inspection system 100 includes a background screen 102, a camera 104, and a glass sheet acquisition and positioning mechanism 10 for receiving a glass sheet as it is conveyed on one of the conveyors 14. As previously described, the glass sheet acquisition and positioning mechanism 10 momentarily removes the glass sheet from the conveyor and positions the glass sheet in the path between the camera 104 and the background screen 102 so that the camera 104 may capture an image of the screen pattern transmitted through the glass sheet.

The glass sheet acquisition and positioning mechanism 10 then repositions the glass sheet on the conveyor 14 for further processing. The inspection system 100 further includes a computer 60 including logic for receiving the captured image data and performing one or more optical processing operations to analyze the optical characteristics of the glass sheet and display or otherwise report selected information associated with the analysis. As previously described, computer 60 may also be operably connected to sensors mounted on the locators 16 and actuators mounted to move the interior support frame 16 to and from each of the various operating positions described herein to controllably position glass sheets for image acquisition and optical processing as further described herein.

In one embodiment, the inspection system 100 may be of the type described in U.S. Patent Application Publication No. 2012/0098959 A1, the disclosure of which Publication is hereby incorporated herein in its entirety. In this embodiment of the optical inspection system 100, the digital image acquired for each glass sheet is downloaded to the computer 60, which is suitably programmed to analyze the image data to determine (1) indicia, including the magnification and lens power, of optical distortion in the observed image of the pattern transmitted through the glass sheet, and (2) small visible optical or obstructive defects on the glass sheet.

In addition to the above-described optical distortion characteristics and data identified and displayed by the system 100, the disclosed system and method may also identify and locate areas of optical and/or obstructive distortion and other visible, defects as small as 1 millimeter in diameter, which appear on the glass sheet surface.

The system 100 may be programmed by the user to graphically and numerically display various indicia of optical distortion, including those indicia most relevant to industry standards such as ECE R43, or other indicia considered relevant in the industry to the analysis of the optical transmission quality of formed and fabricated glass sheets. The system 100 may, as well, be programmed to display the locations of small visible surface defects identified on the glass sheet.

In one embodiment, the background screen 102 provides pattern of dark squares positioned on a light background at a known predetermined distance from each other, forming a rectangular grid such that the image of the grid is projected onto the camera 104 through the glass sheet, G, mounted therebetween. It will be appreciated that other similar contrasting grid patterns may be employed without departing from the spirit of the present disclosure.

The digital camera 104 is mounted to collect images of the grid on screen 102 transmitted through the glass sheet G retained on the glass sheet acquisition and positioning mechanism 10. The camera 104 is connected via a conventional data line to a computer 60 which may be suitably programmed to acquire the digital image data from the camera, process the image data to obtain the desired resolution for the data, and analyze the data to develop various indicia of distortion as well as small marks/defects on the surface of the glass sheet according to the method of the present disclosure as described herein, and as further described in U.S. Patent Application Publication No. 2012/0098959 A1. The computer 60 may also be programmed to present the derived image distortion information in both graphical (e.g., color-coded images) and statistical forms. If desired, various other statistical data can be derived and reported for predefined areas of the glass sheet, including the maximum, minimum, range, mean, and standard deviation in lens power, or other indices of distortion which may be of interest.

As will be appreciated by those skilled in the art, in addition to the method and system described in U.S. Patent Application Publication No. 2012/0098959 A1, other embodiments of the optical inspection system 100 may additionally or alternatively employ other known image processing techniques to collect and analyze image data associated with the glass sheets and provide various indicia of transmitted optical distortion. Similarly, other methodologies for identifying marks and/or defects on the surface of the glass sheet may be developed and employed by the inspection system 100 without departing from the spirit of the present disclosure.

In one embodiment, the grid screen 102 is a light box that utilizes conventional lighting (such as fluorescent lights) behind a translucent panel upon which a contrasting pattern, preferably in the form of a black-square-on-white background grid, is printed, painted, or otherwise applied using conventional methods. The digital camera 104 is connected to the computer 60 using known methods, preferably so that the acquisition of the image by the camera may be controlled by the computer.

Figure 6:
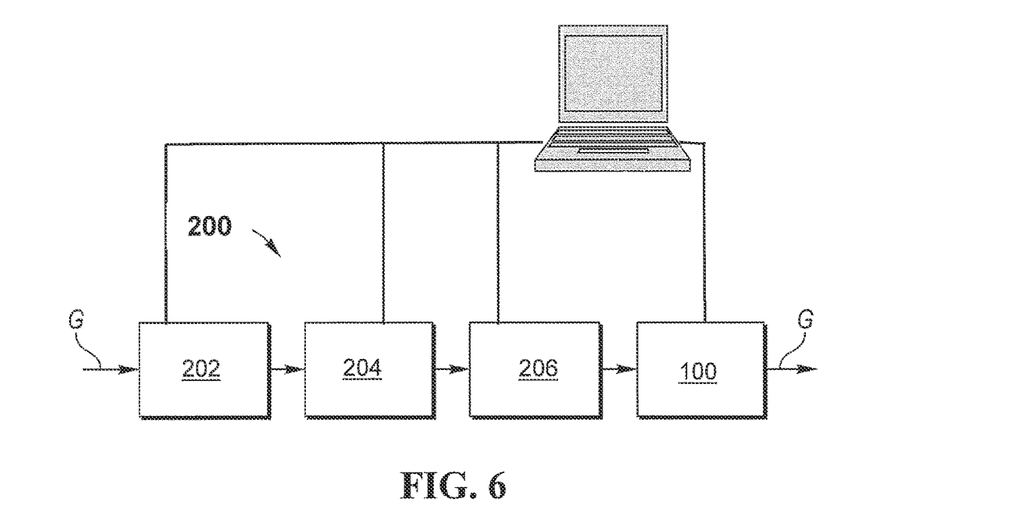
FIG. 6 is a schematic diagram of one embodiment of the disclosed in-line optical inspection system installed in a typical automotive glass forming and tempering line.

FIG. 6 illustrates a typical glass sheet heating, bending, and tempering system 200 which includes the in-line optical inspection system 100, as well as the glass sheet acquisition and positioning system 10, according to the present disclosure. In this installation, the glass sheets (indicated as G) enter a heating zone 202 where the glass is softened to a temperature suitable for forming the glass into the desired shape. The heated glass sheet is then conveyed to a bending station 204 where the softened sheet is formed to the desired shape, and thereafter further conveyed to a cooling station 206 where the glass sheet is cooled in a controlled manner to achieve the appropriate physical characteristics. In this embodiment, the glass sheet would then be conveyed out of the cooling station onto a conveyor from which the sheet is acquired and positioned by the acquisition and positioning mechanism 10 for image acquisition and analysis by the optical inspection system 100 according to the present disclosure. Following the measurement, the glass sheet would then be returned to the conveyor 14 for further processing. It will be appreciated that the transport and conveyance of the glass can be achieved by using known techniques such as by roller, air-float, or belt conveyors, positioners, and robotic arms, in order to handle the glass in the manner described. It will also be appreciated that a plurality of conveyors, each of which may be independently controlled to move the glass sheets through the different processing stations at speeds to efficiently govern the flow and processing of the glass sheets throughout the system 200.

Figure 7:
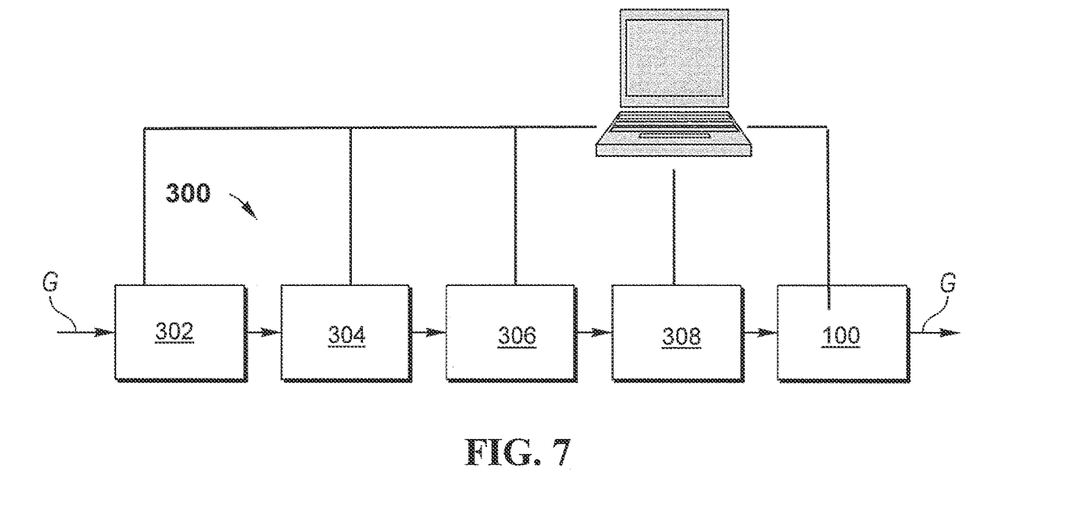
FIG. 7 is a schematic diagram of another embodiment of the disclosed in-line optical inspection system installed in a typical automotive windshield forming line.

FIG. 7 similarly schematically illustrates an in-line optical inspection system 100 and the associated glass sheet acquisition and positioning system 10 of the present disclosure in a typical automotive windshield fabrication system 300, which may include a heating station 302, a bending station 304, a cooling station 306, and a lamination station 308, upstream of the optical inspection system 100.

Selected data output by the disclosed in-line optical inspection system 100 may also be provided as input to the control logic for the associated glass sheet heating, bending, and tempering system 200 (or automotive windshield fabrication system 300) to allow the control(s) for one or more of the stations the glass sheet system to modify its operating parameters as a function of the optical data developed from previously processed glass sheets.

It will be appreciated that the optical inspection system 100 of the present disclosure could alternatively be mounted in-line at various other points in the above-described and other glass sheet fabrication systems as desired to maximize the production rate of the system, so long as the optical distortion measurements are taken after the glass sheet has been formed to its final shape.

It will also be appreciated by those skilled in the art that, although the camera and array screen are arranged in the illustrated embodiments such that the path between the camera 104 and background array 102 is generally parallel to the direction of conveyance of the glass, various alternative arrangements of the system 100 along conveyor(s) suitably connected to the glass sheet processing system may be employed without departing from the spirit of the disclosure.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for measuring optical characteristics of a glass sheet as the glass sheet is conveyed in a system for processing glass sheets including one or more processing stations and one or more conveyors for conveying the glass sheet during processing, the method comprising:
   providing a background screen including contrasting elements arranged in a pre-defined pattern and a camera for acquiring an image of the background screen;
   capturing the glass sheet at a preselected location as the glass sheet is transported on a conveyor of the one or more conveyors;
   removing the glass sheet from the conveyor;
   positioning the glass sheet between the camera and the background screen in a preselected orientation and thereafter acquiring an image of the background screen;
   re-positioning the glass sheet for continued movement of the glass sheet on the conveyor; and
   performing one or more processing operations using acquired image data to analyze the optical characteristics of the glass sheet;
   wherein the positioning and the re-positioning are performed with a moveable glass sheet support frame on which the glass sheet can be retained and which is moveably attached to an exterior frame mounted in proximity to the conveyor so that the glass sheet support frame is moveable from a first generally horizontal orientation to a second, upwardly-tilted orientation in which the glass sheet support frame is elevated from a plane of the conveyor with the glass sheet retained thereon to position the glass sheet between the camera and the background screen, the glass sheet support frame including first and second rails that are each attached to the exterior frame by a connection arrangement including an interconnecting element that is moveable along the exterior frame so that the interconnecting elements are positioned below the conveyor when the glass sheet support frame is in the upwardly-tilted orientation.

2. The method of claim 1 wherein the first and second rails of the glass sheet support frame are each attached to a vertical rail of the exterior frame, and wherein the vertical rails are positioned on opposite sides of the conveyor and each vertical rail extends from below the conveyor to above the conveyor.

3. The method of claim 1 wherein the exterior frame includes first and second stationary vertical rails on each of two sides of the conveyor, and the first and second rails of the glass sheet support frame are each attached to a respective one of the first vertical rails of the exterior frame on a respective side of the conveyor by a respective one of the connection arrangements, and wherein each of the first and second rails of the glass sheet support frame is attached to a respective one of the second vertical rails of the exterior frame on a respective side of the conveyor by an additional connection arrangement including an additional interconnecting element that is movable along the respective second vertical rail so that the additional interconnecting elements are positioned above the conveyor when the glass sheet support frame is in the upwardly-tilted orientation.

4. The method of claim 1 wherein each of the first and second rails of the glass sheet support frame is attached to an additional portion of the exterior frame on a respective side of the conveyor by an additional connection arrangement including an additional interconnecting element that is moveable along the exterior frame so that the additional interconnecting elements are positioned above the conveyor when the glass sheet support frame is in the upwardly-tilted orientation.

5. The method of claim 1 further comprising, before the removing, acquiring data associated with shape of the glass sheet using a sensor, and analyzing the acquired data and identifying the glass sheet as one of a set of known part shapes, and wherein the positioning is performed based in part upon the identified part shape.

6. The method of claim 1 wherein the removing comprises moving the glass sheet off of the conveyor using a transport mechanism including multiple supports that are movable to contact and lift the glass sheet off of the conveyor.

7. The method of claim 6 further comprising positioning the glass sheet relative to the glass sheet support frame using a positioning mechanism that includes multiple positioners that are each movable to contact the glass sheet and orient the glass sheet with respect to the glass sheet support frame, and wherein the removing is performed prior to the positioners of the positioning mechanism contacting the glass sheet.

8. The method of claim 7 wherein positioning the glass sheet relative to the glass sheet support frame using the positioning mechanism is performed while the glass sheet is supported on the transport mechanism.

9. The method of claim 7 further comprising acquiring data associated with shape of the glass sheet using a sensor before the removing, then analyzing the acquired data and identifying the glass sheet as one of a set of known part shapes, and wherein the positioning mechanism is controllable based in part upon the identified part shape to position the glass sheet with respect to the glass sheet support frame.

10. A method for analyzing an optical characteristic of a glass sheet as the glass sheet is conveyed in a system for processing glass sheets including one or more processing stations and one or more conveyors for conveying the glass sheet during processing, the method comprising:
providing a background screen including contrasting elements arranged in a pre-defined pattern and a camera for acquiring an image of the background screen;
removing the glass sheet from a conveyor of the one or more conveyors, wherein the removing comprises moving the glass sheet off of the conveyor with a transport mechanism that contacts and lifts the glass sheet off of the conveyor; positioning the glass sheet relative to a moveable glass sheet support frame, on which the glass sheet can be retained, with a positioning mechanism that contacts the glass sheet and orients the glass sheet with respect to the glass sheet support frame while the glass sheet is supported on the transport mechanism and lifted off of the conveyor, wherein the glass sheet support frame is moveably attached to an exterior frame mounted in proximity to the conveyor;
positioning, with the glass sheet support frame, the glass sheet between the camera and the background screen in a preselected orientation and thereafter acquiring an image of the background screen;
re-positioning, with the glass sheet support frame, the glass sheet for continued movement of the glass sheet on the conveyor; and
performing one or more processing operations using acquired image data to analyze the optical characteristic of the glass sheet.

11. The method of claim 10 wherein the glass sheet support frame is moveable from a first generally horizontal orientation to a second, upwardly-tilted orientation in which the glass sheet support frame is elevated from a plane of the conveyor with the glass sheet retained thereon to position the glass sheet between the camera and the background screen, and wherein the glass sheet support frame includes first and second rails that are each attached to the exterior frame by a connection arrangement including an interconnecting element that is moveable along the exterior frame so that the interconnecting elements are positioned above the conveyor when the glass sheet support frame is in the upwardly-tilted orientation.

12. The method of claim 11 wherein the first and second rails of the glass sheet support frame are each attached to a vertical rail of the exterior frame, and wherein the vertical rails are positioned on opposite sides of the conveyor and each vertical rail extends above the conveyor.

13. The method of claim 10 wherein the glass sheet support frame is moveable from a first generally horizontal orientation to a second, upwardly-tilted orientation in which the glass sheet support frame is elevated from a plane of the conveyor with the glass sheet retained thereon to position the glass sheet between the camera and the background screen, and wherein the glass sheet support frame includes first and second rails that are each attached to the exterior frame by a connection arrangement including an interconnecting element that is moveable along the exterior frame so that the interconnecting elements are positioned below the conveyor when the glass sheet support frame is in the upwardly-tilted orientation.

14. The method of claim 13 wherein the first and second rails of the glass sheet support frame are each attached to a vertical rail of the exterior frame, and wherein the vertical rails are positioned on opposite sides of the conveyor and each vertical rail extends from below the conveyor to above the conveyor.

15. The method of claim 10 wherein the glass sheet support frame is moveable from a first generally horizontal orientation to a second, upwardly-tilted orientation in which the glass sheet support frame is elevated from a plane of the conveyor with the glass sheet retained thereon to position the glass sheet between the camera and the background screen, wherein the exterior frame includes first and second stationary vertical rails on each of two sides of the conveyor, and the glass sheet support frame includes first and second rails that are each attached to each of the first and second vertical rails of the exterior frame on a respective side of the conveyor by a connection arrangement including an interconnecting element that is moveable along a respective one of the vertical rails, and wherein, for each of the first and second rails of the glass sheet support frame, one of the interconnecting elements is positioned above the conveyor and the other interconnecting element is positioned below the conveyor when the glass sheet support frame is in the upwardly-tilted orientation.

16. The method of claim 10 wherein the glass sheet support frame is moveable from a first generally horizontal orientation to a second, upwardly-tilted orientation in which the glass sheet support frame is elevated from a plane of the conveyor with the glass sheet retained thereon to position the glass sheet between the camera and the background screen, wherein the glass sheet support frame includes first and second rails that are each attached to two portions of the exterior frame on a respective side of the conveyor by a connection arrangement including an interconnecting element that is moveable along the exterior frame, and wherein, for each of the first and second rails of the glass sheet support frame, one of the interconnecting elements is positioned above the conveyor and the other interconnecting element is positioned below the conveyor when the glass sheet support frame is in the upwardly-tilted orientation.

17. The method of claim 10 further comprising acquiring data associated with shape of the glass sheet before the removing, then analyzing the acquired data and identifying the glass sheet as one of a set of known part shapes, and wherein the positioning is performed based in part upon the identified part shape.

18. The method of claim 10 wherein the transport mechanism includes multiple supports that are movable to contact and lift the glass sheet off of the conveyor.

19. The method of claim 10 wherein the positioning mechanism includes multiple positioners that are movable to contact the glass sheet and orient the glass sheet with respect to the glass sheet support frame.

* * * * *